United States Patent
Kertesz

(10) Patent No.: US 7,687,745 B2
(45) Date of Patent: Mar. 30, 2010

(54) FLUID LINE

(75) Inventor: Janos Kertesz, Hofheim (DE)

(73) Assignee: NORMA Germany GmbH, Maintal (DE)

( * ) Notice: Subject to any disclaimer, the term of this patent is extended or adjusted under 35 U.S.C. 154(b) by 868 days.

(21) Appl. No.: 11/402,067

(22) Filed: Apr. 11, 2006

(65) Prior Publication Data

US 2006/0193613 A1    Aug. 31, 2006

Related U.S. Application Data

(62) Division of application No. 10/947,044, filed on Mar. 17, 2005, now Pat. No. 7,256,656.

(30) Foreign Application Priority Data

Oct. 21, 2003  (DE) ............................... 103 49 418
Jan. 14, 2004  (DE) ....................... 10 2004 001 887

(51) Int. Cl.
*H05B 3/58*   (2006.01)
*F24H 1/10*   (2006.01)

(52) U.S. Cl. .................. 219/535; 219/534; 219/536; 392/468; 392/469; 392/465; 392/480; 392/476; 392/466; 392/479

(58) Field of Classification Search ............ 392/468–9, 392/465, 480, 476, 466, 479; 219/534–536
See application file for complete search history.

(56) References Cited

U.S. PATENT DOCUMENTS 3,603,403 A * 9/1971 Horwinski ..................... 169/5
4,352,007 A * 9/1982 Baker et al. ................. 392/472
6,738,566 B2 * 5/2004 Pagnella ..................... 392/472

* cited by examiner

*Primary Examiner*—Shawntina Fuqua
(74) *Attorney, Agent, or Firm*—Friedrich Kueffner

(57) ABSTRACT

A fluid line with a pipe provided with a sleeve of a woven or braided fabric, wherein the pipe, in turn, includes at least one conductor. In the finished state of the fluid line, the sleeve immediately surrounds the pipe and each conductor is loosely arranged in the sleeve. In accordance with another embodiment, the at least one conductor forms the sleeve.

15 Claims, 3 Drawing Sheets

FLUID LINE

CROSS-REFERENCE TO RELATED APPLICATIONS

This application is a Divisional Application of U.S. application Ser. No. 10/947,044, filed Mar. 17, 2005 now U.S Pat. No. 7,256,656.

BACKGROUND OF THE INVENTION

1. Field of the Invention

The present invention relates to a fluid line with a pipe provided with a sleeve of a woven or braided fabric, wherein the pipe, in turn, includes at least one conductor.

2. Description of the Related Art

A fluid line of the above-described type is frequently used in motor vehicles for heating a fluid which freezes or becomes viscous at low temperatures.

For example, DE 199 15 228 A1 discloses a heatable fluid line of the above-described type for a brake system of a motor vehicle, wherein a middle rubber layer is provided on an inner pipe of rubber, and wherein a reinforcing fabric forming the sleeve is embedded in the middle rubber layer, and wherein the middle rubber layer is surrounded by a radially outer rubber layer. An electrical heating conductor is woven or braided into the reinforcing fabric. The manufacture of this fluid line having several layers is complicated.

SUMMARY OF THE INVENTION

Therefore, it is the primary object of the present invention to provide a fluid line of the above-described type which is of simpler construction.

In accordance with a first embodiment of the present invention, in the finished state of the fluid line, the sleeve immediately surrounds the pipe and each conductor is loosely arranged in the sleeve.

The fluid line according to this first embodiment does not have a middle rubber layer embedded in the sleeve, and, when the fluid line is manufactured, the woven or braided fabric forming the sleeve is not embedded in the middle layer. The pipe does not have to be of rubber, as is the case in the known case, however, the pipe may also be composed of rubber or another material, for example, thermoplastic material or metal. Consequently, once the pipe is manufactured, the sleeve can be easily manufactured by placing it around the pipe. Simultaneously, the conductor may be woven or braided into the sleeve. If desired, the sleeve or the conductor can be retrofitted. If the sleeve has a sufficient strength, it may also serve for reinforcing or protecting the pipe. If after manufacturing the sleeve one end of the conductor ends flush with an end of the sleeve, while the other end of the conductor protrudes to a sufficient extent from the other end of the sleeve, it is possible, since the conductor is arranged loosely in the sleeve, to grasp the conductor at the protruding end in a simple manner and to push the conductor at the protruding end slightly out of the sleeve in order to provide both ends of the conductor with contacts, or, in the case of two conductors, to connect conductor ends which protrude form the sleeve or have been pulled out of the sleeve, so that a forward and return conductor is provided.

In addition, the sleeve may surround the pipe so as to be exposed toward the outside. If desired, an outer rubber layer can be omitted.

In accordance with a second embodiment of the present invention, each conductor forms the sleeve.

In this second embodiment, the sleeve and the conductor are not constructed separately because the conductor itself forms the sleeve for the woven or braided fabric.

In accordance with a preferred feature, each conductor is a heating or light conductor. The fluid can be heated in the pipe by means of the heating conductor. If the conductor is constructed as a light conductor, the pipe may serve as a support for the conductor, for example, in a motor vehicle, so that it is not necessary to separately place or assemble the light conductor.

The heating conductor may be an electrical heating wire or a fluid conductor for a hot heating fluid. A strand could also be used as a heating conductor; however, a single heating wire can be more easily received in the woven or braided fabric when the fabric is being manufactured. A fluid conductor, for example a thin hose of an elastomer material, can advantageously be used when a hot heating fluid is available, for example, the heated cooling water in a motor vehicle. Heated air or a hot exhaust gas would also be suitable. Steam may also be suitable in other situations.

In those cases in which the fluid has to be cooled in the pipe, the conductor may be a coolant conductor.

It may also be ensured that each heating conductor or coolant conductor is partially in contact with the pipe through the material of the sleeve. This results in a better heat transfer between the pipe and the heating conductor or coolant conductor.

A glass fiber or plastic fiber is particularly suitable as the light conductor. Both may be constructed so as to be flexible in order to make it possible to place the light conductor along curved paths.

Moreover, the entire sleeve may be composed of fibers of glass, plastics material, carbon, minerals or metal, or of natural fibers. The woven or braided fabric can be easily manufactured from such fibers.

Also, each conductor can be arranged in the woven or braided fabric so as to extend along a straight line or a wavy pattern. In particular, each conductor may be wound helically around the pipe.

Moreover, each heating wire may be arranged in insulating material. Preferably, the heating wire is arranged helically in elongated insulating material. In this connection, the insulating material may include a glass fiber bundle around which each heating wire is wound, as well as a flexible plastic layer surrounding the heating wire and the glass fiber bundle. A heating conductor constructed in this manner is overall very flexible and, therefore, the heating conductor can be bent as desired when being placed or during weaving or braiding.

The pipe may be smooth or wavy, wherein the sleeve may be arranged loosely on the pipe. Even if the pipe is wavy, the sleeve can be easily pushed onto the pipe until it reaches its desired position, particularly if the sleeve is being retrofitted.

Moreover, each conductor may be displaceable in the sleeve in the longitudinal direction thereof. As a result, the conductor is easily accessible at its ends when the sleeve is pushed together, so that the conductor can be connected to a current source, a fluid source or light source. Also, it is possible to expose the pipe temporarily at its ends by pushing together the sleeve in order to clamp the pipe when inserting a plug connector into the end of the pipe.

As an alternative to a completely loose arrangement of the sleeve on the pipe, the sleeve may be attached to the pipe at least at one location. The sleeve can then no longer be pushed.

Instead of leaving the sleeve exposed toward the outside, the sleeve can also be surrounded by a protective sleeve which is composed of thermoplastic material and is arranged, injected or extruded onto the sleeve. Also in this case, initially a portion of the conductor can be pulled laterally out of the first-mentioned sleeve and the first-mentioned sleeve can be cut to the desired length before the protective sleeve is mounted, so that the conductor is exposed after the protective sleeve has been mounted and can be provided with contacts, or, in the case of two conductors, the ends thereof can be connected in order to form a forward and return conductor.

Alternatively, in a fluid line having a pipe of flexible material in which a conductor is arranged through which a current can be conducted for changing the temperature of the fluid in the fluid line, the conductor may be arranged in a groove in the outer side of the pipe. The sleeve is then unnecessary. The groove can be undercut, so that the conductor can engage and be locked in the groove. The conductor is then not easily separated from the pipe.

The conductor may also be in this case an electrical conductor, a fluid conductor or a light conductor, as described above.

The various features of novelty, which characterize the invention, are pointed out with particularity in the claims annexed to and forming part of the disclosure. For a better understanding of the invention, its operating advantages, and specific objects attained by its use, reference should be had to the drawing and descriptive matter in which there are illustrated and described preferred embodiments of the invention.

DESCRIPTION OF THE PREFERRED EMBODIMENTS

Figure 1:
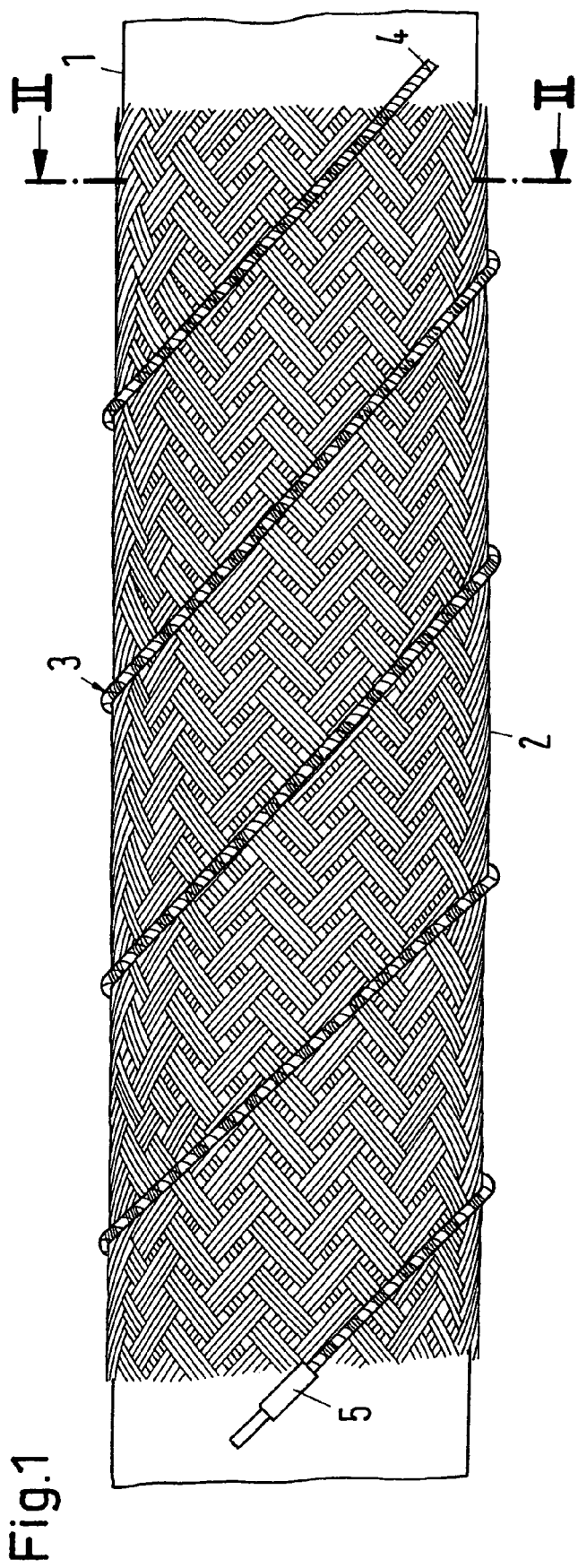
FIG. 1 is a side view of a first embodiment of the fluid line according to the present invention.
Figure 2:
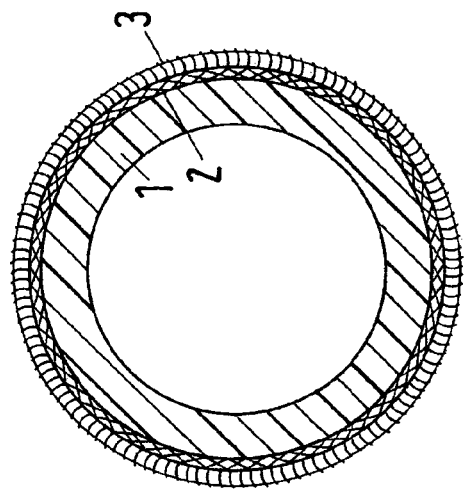
FIG. 2 is a sectional view taken along sectional line II-II of FIG. 1.

The embodiment of the fluid line according to the present invention shown in FIGS. 1 and 2 includes a pipe 1, a sleeve 2 in the form or a woven fabric surrounding the pipe 1, and a heating conductor 3 woven into the fabric.

The pipe 1 is of plastics material, preferably thermoplastic material, such as polyamide, however, the pipe 1 may also consist of rubber or metal. The pipe 1 may also consist of multiple layers. In each case, the pipe is impermeable to hydrocarbons, such as oil. As shown in the drawing, the pipe is smooth. However, the pipe may also be wavy. The pipe preferably is flexible.

The sleeve 2 is a braided fabric of plastic fibers; however, the sleeve 2 may also consist of glass fibers, natural fibers, mineral fibers or metal fibers. The sleeve 2 is arranged loosely on the pipe 2 and, in the finished state of the fluid line, is exposed toward the outside. Also, the sleeve 2 is slidable on the pipe 2. Therefore, the sleeve 2 can be retrofitted on the pipe and can be pushed to the desired location. The sleeve 2 has a high strength so that the sleeve 2 protects the pipe 1 against excessive expansion at high internal pressures. Moreover, the sleeve 2 is resistant to chafing. Accordingly, the sleeve 2 protects the pipe 1 also against abrasion. The sleeve can be easily exchanged for purposes of repair. The pipe 1 and the sleeve 2 can also be recycled.

The heating conductor 3 is braided into the fabric of the sleeve 2. However, the sleeve 2 can also be constructed as a woven fabric into which the heating conductor 3 is woven. The heating conductor 3 contains a heating wire 4 which helically surrounds an elongated insulating material. The insulating material is a glass fiber bundle around which the heating wire 4 is wound. The heating wire 4 and the glass fiber bundle are surrounded by a translucent flexible plastic layer which, in turn, is electrically insulating. Moreover, the heating conductor 3 is displaceable within the sleeve 2.

The helical arrangement of the heating wire 4 makes it possible to use a resistance wire having a low resistance per unit of length. As compared to an arrangement of the heating conductor along a straight line, the helical arrangement of the heating wire 3 increases the heating power per unit of surface area of the pipe 1. The fact that the heating conductor 3 can be displaced within the sleeve 2 makes it possible, by axially compressing the braided fabric of the sleeve 2, to push portions of the heating conductor 3 out of the sleeve 2, when the ends of the heating conductor 3 are flush with the ends of the cut sleeve 2 when the sleeve is cut from a longer endless sleeve. The portions of the heating conductor 3 which protrude out at the ends thereof can then be insulated and the heating wire 4 can be provided with a contact, such as the schematically illustrated connecting plug 5 or a contact terminal, in order to connect the heating conductor 3 to a current source. Conversely, if one end of the heating conductor 3 is flush with one end of the sleeve 2 and its other end protrudes sufficiently far out of the other end of the sleeve 2, the heating conductor 3 can be pushed to such an extent in the sleeve 2 until the first end also protrudes out of the sleeve 2, so that it can be provided with a contact.

Figure 3:
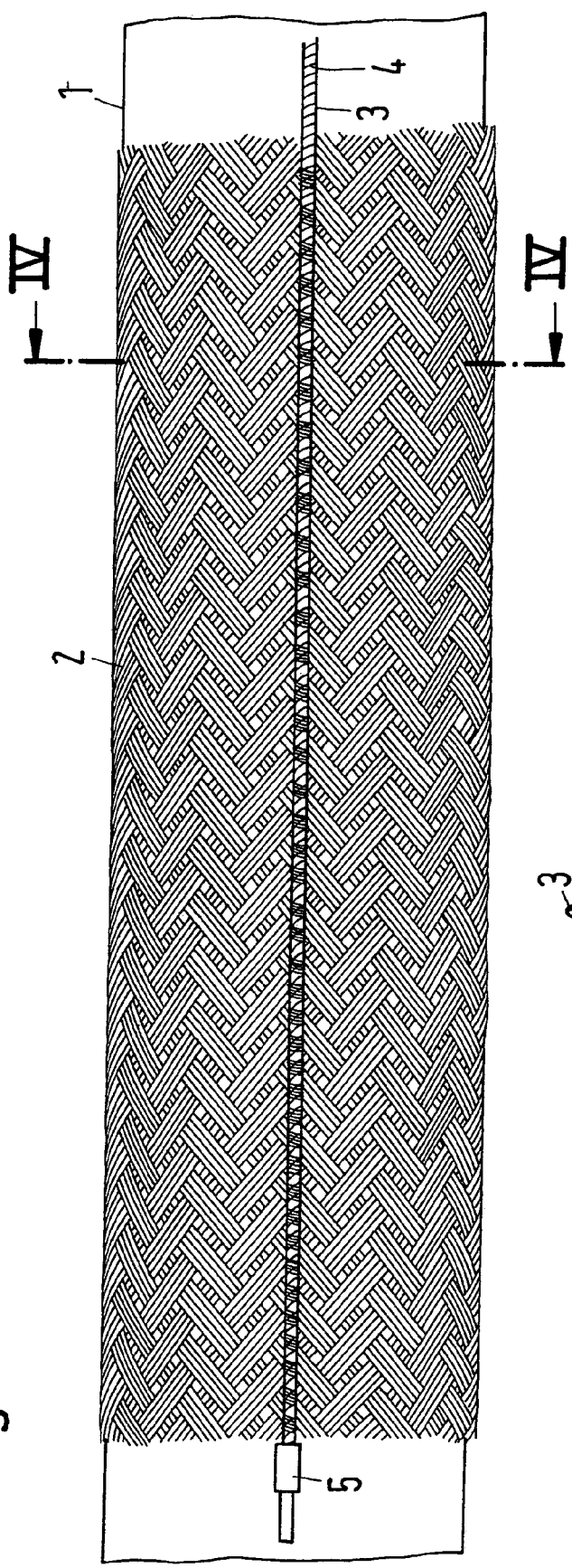
FIG. 3 is a side view of a second embodiment of the fluid line according to the present invention.
Figure 4:
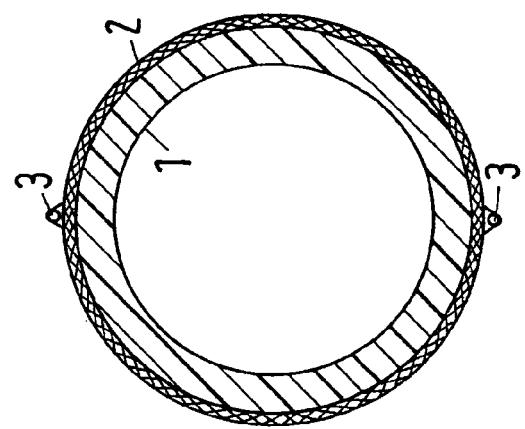
FIG. 4 is a sectional view taken along sectional line IV-IV of FIG. 3.

The embodiment according to FIGS. 3 and 4 differs from the first embodiment only in that the heating conductor 3 is not arranged helically, but along a straight line in the sleeve 2, and that, instead of one heating conductor as provided in the first embodiment, two heating conductors arranged diametrically opposite each other are provided, wherein the heating conductors 3 can be either connected in series or parallel, so that the fluid flowing in the pipe 1 is heated from two sides.

The illustrated embodiments can be varied in many respects: the conductor may alternatively be a light conductor or a fluid conductor. In the case of a light conductor, the pipe may serve as a support so that the light conductor does not have to be mounted separately if the light conductor is to be substantially placed on the same path as the pipe. If used as a fluid conductor, it can be constructed as a pipe or hose through which a hot fluid or a cooling fluid is conducted.

After the sleeve has been pushed onto the pipe, the sleeve can be attached to the pipe at least at one location, in order to prevent an unintentional displacement of the sleeve.

Moreover, the entire sleeve may be constructed as a conductor; the conductor may be either a heating conductor, a fluid conductor or a light conductor. The same material scan be used for the sleeve and the conductor. The sleeve 1 can also be surrounded by a protective sleeve. This protective sleeve may include thermoplastic material and may be arranged, injected or extruded onto the sleeve 1.

The conductor may also be arranged in a groove in the outer side of the pipe, so that a sleeve becomes unnecessary. The groove can be undercut, so that he conductor can be secured or locked in the groove. In this manner, the conductor can be arranged in a defined position in the pipe, without loosening easily from the pipe. The groove may be helical or straight. Moreover, in this case, the conductor may also be a heating conductor, a light conductor or a fluid conductor.

Figure 5:
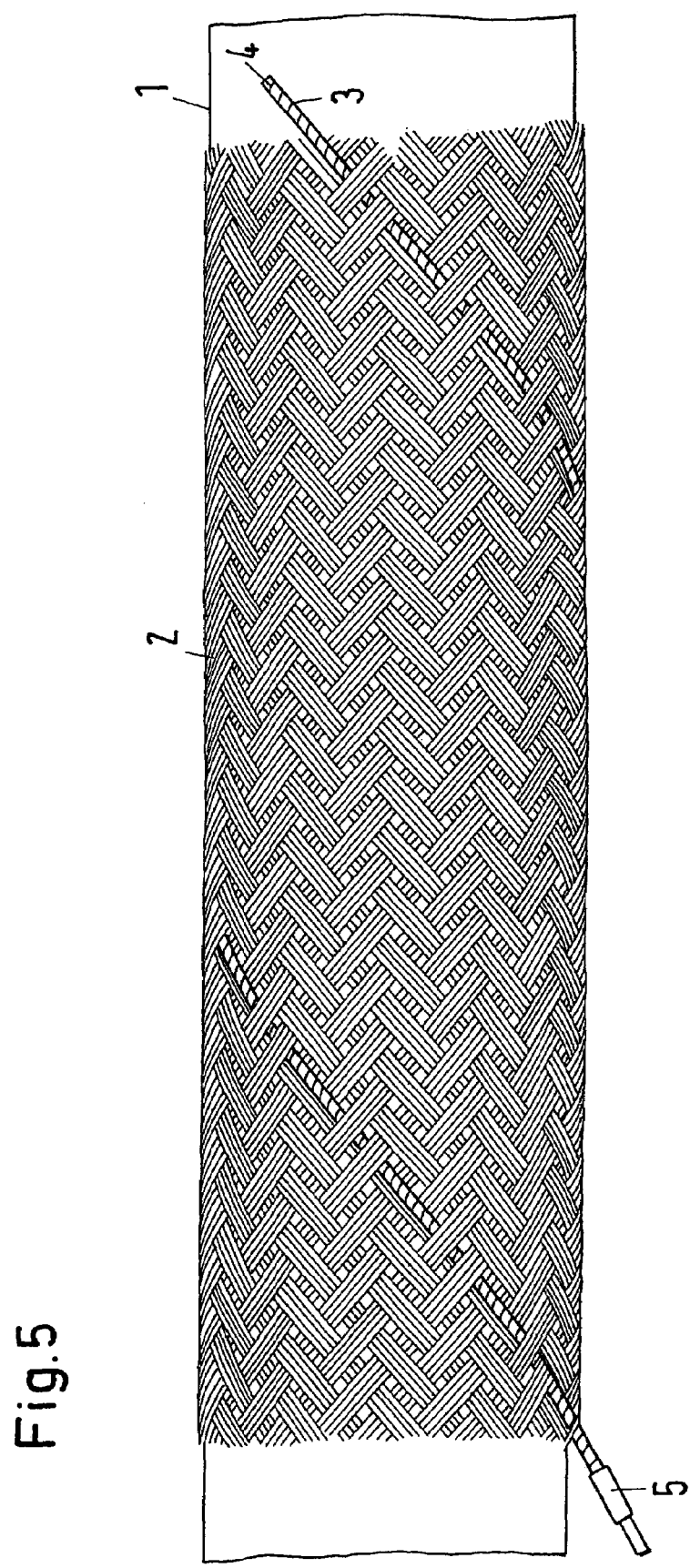
FIG. 5 is a side view of a third embodiment of the fluid line according to the present invention.

While in the embodiments according to FIGS. 1 to 4, the conductor 3 may rest against the pipe 1 only at those points at which few threads of the braided fabric of the sleeve 2 extend closely next to each other over the conductor, as schematically illustrated in the drawing, the conductor 3 showing in the embodiment of FIG. 5 rests against the pipe 1 over a larger surface area where it extends under several adjacent fiber bundles of the sleeve 2. This results in a better heat transfer between the pipe 1 and the conductor 3 if the conductor 3 is a heating conductor or a coolant conductor.

The invention is not limited by the embodiments described above which are presented as examples only but can be modified in various ways within the scope of the protection defined by the appended patent claims.

What is claimed is:

1. A fluid line comprising a pipe with a sleeve of a woven or braided fabric, wherein the woven or braided fabric includes at least one conductor, and wherein, in a finished state of the fluid line, the sleeve immediately surrounds the pipe and the at least one conductor is loosely arranged in the sleeve, wherein the at least one conductor is a coolant conductor.

2. The fluid line according to claim 1, wherein the sleeve surrounds the pipe and is outwardly exposed.

3. A fluid line comprising a pipe with a sleeve of a woven or braided fabric, wherein the woven or braided fabric includes at least one conductor, and wherein the at least one conductor forms the sleeve, wherein the at least one conductor is a coolant conductor.

4. The fluid line according to claim 1, wherein the at least one light conductor is composed of glass fiber or plastic fiber.

5. The fluid line according to claim 1, wherein the pipe is smooth or wavy.

6. The fluid line according to claim 3, wherein the pipe is smooth or wavy.

7. The fluid line according to claim 1, wherein the sleeve is arranged loosely on the pipe.

8. The fluid line according to claim 3, wherein the sleeve is arranged loosely on the pipe.

9. The fluid line according to claim 1, wherein the at least one conductor is slidable in longitudinal direction in the sleeve.

10. The fluid line according to claim 3, wherein the at least one conductor is slidable in longitudinal direction in the sleeve.

11. The fluid line according to claim 1, wherein the sleeve is attached at at least one location to the pipe.

12. The fluid line according to claim 1, wherein the sleeve is surrounded by a protective sleeve.

13. The fluid line according to claim 12, wherein the protective sleeve includes thermoplastic material and the protective sleeve is arranged, injected or extruded onto the sleeve.

14. A fluid line comprising a pipe of flexible material, and a conductor arranged in the material, wherein a current can be conducted through the conductor for changing the temperature of the fluid in the fluid line, and wherein an outer side of the pipe has a groove, and the conductor is arranged in the groove, wherein the groove is undercut, so that the conductor can be engaged in the groove.

15. The fluid line according to claim 14, wherein the conductor is an electrical conductor or a fluid conductor.

* * * * *